United States Patent [19]

Anand et al.

[11] Patent Number: 4,840,646

[45] Date of Patent: Jun. 20, 1989

[54] TETRABROMO BISPHENOL BASED POLYESTERCARBONATE MEMBRANES AND METHOD OF USING

[75] Inventors: Joginder N. Anand, Clayton, Calif.; Stephen E. Bales, Midland, Mich.; Darrell C. Feay, Orinda; Thomas O. Jeanes, Antioch, both of Calif.

[73] Assignee: The Dow Chemical Company, Midland, Mich.

[21] Appl. No.: 221,483

[22] Filed: Jul. 19, 1988

Related U.S. Application Data

[63] Continuation-in-part of Ser. No. 856,878, Apr. 28, 1986, abandoned.

[51] Int. Cl.$^4$ .............................................. B01D 53/22
[52] U.S. Cl. .......................................... 55/16; 55/68; 55/158
[58] Field of Search ........................... 55/16, 68, 158; 528/191, 196, 202

[56] References Cited

U.S. PATENT DOCUMENTS

| | | | |
|---|---|---|---|
| Re. 35,351 | 7/1980 | Hoehn et al. | 55/16 |
| 3,028,364 | 4/1962 | Conix et al. | |
| 3,030,331 | 4/1962 | Goldberg | |
| 3,169,121 | 2/1965 | Goldberg | |
| 3,207,814 | 9/1965 | Goldberg | |
| 3,256,675 | 6/1966 | Robb | 55/158 X |
| 3,334,154 | 8/1967 | Kim | 528/191 X |
| 3,720,721 | 3/1973 | Becker et al. | 528/191 X |
| 3,729,447 | 4/1973 | Haberland | |
| 3,776,887 | 12/1973 | Juelke et al. | |
| 3,794,617 | 2/1974 | Mains et al. | 528/191 |
| 3,873,504 | 3/1975 | Boettcher et al. | 528/191 X |
| 3,945,926 | 3/1976 | Kesting | 264/41 |
| 4,066,623 | 1/1978 | Besso et al. | 528/191 X |
| 4,086,310 | 4/1978 | Bottenbruch et al. | 55/158 X |
| 4,156,069 | 5/1979 | Prevorsek et al. | 528/182 |
| 4,169,868 | 10/1979 | Schreckenberg et al. | 525/439 |
| 4,194,038 | 3/1980 | Baker et al. | 528/182 |
| 4,195,157 | 3/1980 | Mark | 528/191 X |
| 4,255,556 | 3/1981 | Segal et al. | 528/191 X |
| 4,297,455 | 10/1981 | Lindner et al. | 528/191 X |
| 4,310,652 | 1/1982 | Debona et al. | 528/125 |
| 4,322,521 | 3/1982 | Williams | 528/191 X |
| 4,346,209 | 8/1982 | Forschirm et al. | 528/191 |
| 4,390,682 | 6/1983 | Kyo et al. | 528/191 X |
| 4,429,083 | 1/1984 | Nakagawa et al. | 528/191 X |
| 4,526,956 | 7/1985 | Mark | 528/191 X |
| 4,717,393 | 1/1988 | Hayes | 55/16 |

FOREIGN PATENT DOCUMENTS

| | | | |
|---|---|---|---|
| 0242147 | 10/1987 | European Pat. Off. | 55/158 |
| 49-123997 | 11/1974 | Japan | 55/158 |
| 53-066880 | 6/1978 | Japan | 55/158 |
| 56-131657 | 10/1981 | Japan . | |
| 56-133332 | 10/1981 | Japan . | |
| 58-008511 | 1/1983 | Japan | 55/158 |
| 56-107351 | 1/1983 | Japan . | |
| 59-22724 | 2/1984 | Japan . | |
| 59-120206 | 7/1984 | Japan | 55/158 |
| 60-228531 | 10/1985 | Japan . | |
| 3400238 | 7/1985 | United Kingdom . | |

OTHER PUBLICATIONS

Chern et al., Chapter 2, "Material Selection for Membrane Based Gas Separations", *Materials Science of Synthetic Membranes*, Lloyd Ed., pp. 25–46, America Chemical Society (1985).

Muruganandam, University of Texas at Austin, Separations Research Program, paper presented at Fall meeting on Oct. 28 and 29, 1985, "Absorption and Transport in Substituted Polycarbonates and Polystyrene/Tetramethyl Polycarbonates and Polystyrene/Tetramethyl Polycarbonate Blends".

*Primary Examiner*—Robert Spitzer
*Attorney, Agent, or Firm*—Norman L. Sims

[57] ABSTRACT

The invention is a membrane comprising a dense skin of a polyestercarbonate, wherein the diphenolic residue in the backbone of the polyestercarbonate is a tetrabromo diphenolic residue, wherein the membrane has a separation factor for oxygen and nitrogen of 6.5 or greater at about 24° C. In another aspect, the invention is a method of separating oxygen from a mixture of gases comprising nitrogen and oxygen, wherein the method comprises (a) contacting the gas mixture with a thin, non-porous membrane comprising a polyestercarbonate described hereinbefore under conditions such that the oxygen selectively permeates through the membrane to the other side of the membrane; and (b) removing the permeated oxygen from the other side of the membrane, wherein separation factor for the oxygen and nitrogen is 6.5 or greater at about 24° C. The membranes of this invention demonstrate surprisingly high separation factors for oxygen and nitrogen separations. The membranes of this invention have good mechanical properties and therefore are useful under more extreme conditions, for example temperature and pressure, than many commercially used membranes.

36 Claims, No Drawings

TETRABROMO BISPHENOL BASED POLYESTERCARBONATE MEMBRANES AND METHOD OF USING

CROSS REFERENCE TO RELATED APPLICATION

This is a continuation-in-part of co-pending application Ser. No. 856,878, filed Apr. 28, 1986, now abandoned.

BACKGROUND OF INVENTION

This invention relates to novel membranes with a thin non-porous discriminating layer comprising a tetrabromo bisphenol based polyestercarbonate. Further disclosed is a process for separating oxygen from a gas mixture comprising oxygen and nitrogen using such membranes.

In various industries, it is necessary or highly desirable to separate one component from another in a gaseous stream. Processes used to perform such separations include pressure swing absorption and membrane separations. In a membrane separation, a gaseous stream containing the components to be separated is contacted with a membrane, wherein the membrane separates two regions in a manner such that only those materials which permeate through the membrane can communicate from one region to the other. Such membranes are semi-permeable, in that one component of the gaseous mixture selectively permeates through the membrane at a rate much higher than one or more of the components in the gaseous stream. The gaseous mixture is contacted with the membrane in a manner such that the selectively permeable species is preferentially transported through the membrane to the other region. It is to be noted that the component from which the selectively permeable species is to be separated may in fact permeate through the membrane at a much slower rate than the selectively permeable species. It is this difference in rates of permeation which is used to separate the gaseous species or reduce the concentration of the less selectively permeated species in the region to which the permeating gases permeate.

In such separations, the relative rate of permeation, that is, the difference in rate of permeation between the selectively permeating gas and the non-selectively permeating gas, is a major factor in the separation achieved. The higher the ratio of permeation of the selectively permeable gas over the non-selectively permeable gas, the better the membrane will perform. Therefore, it is desirable to have as high a ratio as possible.

Presently, membranes derived from acetate esters, for example cellulose triacetate, and olefins, for example polyethylene, polypropylene, poly-4-methylpentene-1, are used for gas separations. Among such separations are the separation of oxygen from nitrogen, and carbon dioxide from methane.

Some of the materials used in membranes suffer from certain disadvantages. One such problem is the inability to perform under extreme conditions, such as high temperatures and pressures. As a result, certain separations are limited by the membrane as to the temperatures and pressures which may be used.

What are needed are membranes with a higher relative rate of permeation through the membrane of the selectively permeating species over the non-selectively permeating species. Further what is needed is a membrane which has enhanced mechanical strength so as to withstand more extreme temperatures and pressures.

SUMMARY OF INVENTION

The invention is a membrane comprising a dense skin of a polyestercarbonate, wherein the diphenolic residue in the backbone of the polyestercarbonate is a tetrabromo diphenolic residue, wherein the membrane has a separation factor for oxygen and nitrogen of 6.5 or greater at about 24° C.

In another aspect, the invention is a method of separating oxygen from a mixture of gases comprising nitrogen and oxygen, wherein the method comprises (a) contacting the gas mixture with a membrane comprising a thin, dense skin of polyestercarbonate described hereinbefore under conditions such that the oxygen selectively permeates through the membrane to the other side of the membrane: and (b) removing the permeated oxygen from the other side of the membrane, wherein separation factor for the oxygen and nitrogen is 6.5 or greater at about 24° C.

The membranes of this invention demonstrate surprisingly high separation factors for oxygen and nitrogen separations. The membranes of this invention have good mechanical properties and therefore are useful under more extreme conditions, for example temperature and pressure, than many commercially used membranes.

DETAILED DESCRIPTION OF THE INVENTION

The membranes of this invention are prepared from polyestercarbonates, wherein the polyestercarbonates are prepared from bisphenols which are tetrabromo substituted. Such polyestercarbonates contain both ester linkages and carbonate linkages as functional groups in the backbone of the polymer. These polymers are prepared generally by reacting a bisphenolic with a dicarboxylic acid or dicarboxylic acid halide and phosgene. The polymers of this invention are randomized copolymers, wherein randomized refers herein to the fact that the ester and carbonate functional groups appear in a random arrangement along the backbone of the polymer.

The polyestercarbonates useful in this invention include blends of a polyestercarbonate and a polycarbonate to give the desired overall carbonate to ester group ratio in the resulting blend. The polymers can be blended by means well known in the art. See for example Feay U.S. Pat. No. 4,710,548 incorporated herein by reference. Blends of polyestercarbonates and polycarbonates are equivalent in function to polyestercarbonates which have the same ester to carbonate ratio.

Preferred polyestercarbonates from which the membranes of this invention are prepared include those which correspond to the formula

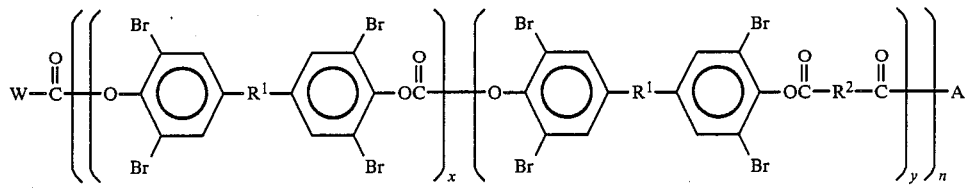

wherein
A is

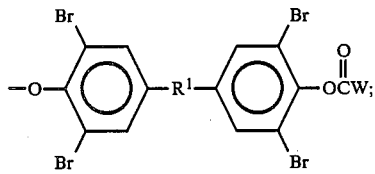

$R^1$ is separately in each instance of a single direct bond,

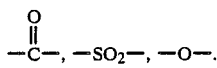

a $C_{1-6}$ divalent hydrocarbon, $C_{1-6}$ divalent fluorocarbon, or an inertly substituted $C_{1-6}$ divalent hydrocarbon radical;
$R^2$ is separately in each instance a $C_{1-20}$ divalent hydrocarbon or a $C_{1-20}$ divalent hydrocarbon, substituted with one or more halo moieties;
W is the residue of a monofunctional compound which is reactive with a chloroformate functionality;
x is 0 or 1;
y is 0 or 1;
n is 50 or greater;
with the proviso that the ratio of units wherein x=1 to units wherein y=1 is between about 99:1 to about 1:99, inclusive.

In the hereinbefore presented formula, $R^1$ is preferably a direct bond, a $C_{1-6}$ divalent hydrocarbon, a $C_{1-6}$ divalent fluorocarbon, or an inertly substituted divalent $C_{1-6}$ hydrocarbon. More preferably, $R^1$ is a divalent $C_{1-6}$ hydrocarbon. Even more preferably, $R^1$ is a divalent C1-6 alkylidene. $R^1$ is most preferably propylidene.

$R^2$ is preferably a divalent $C_{1-20}$ aliphatic, $C_{5-20}$ cycloaliphatic, $C_{6-20}$ aromatic, a halo-substituted $C_{6-20}$ aromatic, a halo-substituted $C_{1-20}$ aliphatic, or a halo-substituted $C_{5-20}$ cycloaliphatic hydrocarbon. $R^2$ is more preferably a divalent $C_{5-20}$ cycloaliphatic, a $C_{6-20}$ aromatic, a halo-substituted $C_{5-20}$ cycloaliphatic, or a $C_{6-20}$ halo-substituted aromatic hydrocarbon. $R^2$ is more preferably

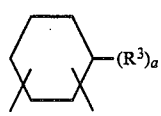

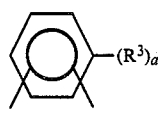

-continued

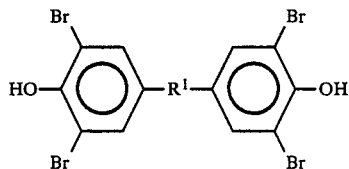

wherein
$R^3$ is separtely in each occurrence chlorine, fluorine, phenyl, or halogenated alkyl; and
a is 0 to 4.
$R^2$ is most preferably W is preferably the residue of a monofunctional aliphatic alcohol, thiol, aromatic alcohol, or amine. W is more preferably the residue of a monofunctional phenol or alcohol.

W is even more preferably a $C_{1-20}$ hydrocarbyloxy radical. W is even more preferably $C_{1-20}$ alkoxy, $C_{6-10}$ aryloxy, and $C_{7-20}$ alkyl-substituted aryloxy. W is most preferably paratertiarybutyl phenyloxy or methoxy.

Preferably, a is 0 or 1, and most preferably 0.

Preferably, the polymers useful in this invention have an inherent viscosity of between about 0.3 and about 1.2. Below 0.3 it is difficult to prepare a film useful as a membrane. Above 1.2, the polymer becomes difficult to work with.

Such polymers can have a ratio of ester to polycarbonate groups of from about 99:1 to about 1:99, more preferably, between about 10:90 and 90:10. Most preferably, the ratio of ester-to-carbonate functional groups in the backbone of the polymer is between about 15:85 and 85:15.

Bisphenolic groups useful in the preparation of the polyestercarbonate polymers used to make the membranes of this invention include any bisphenolic compounds which are tetrabromo-substituted. Preferred tetrabromo-substituted bisphenolics correspond to the formula wherein $R^1$ is as hereinbefore defined. Examples of such bisphenolics include 3,3',5,5'-tetrabromo-4,4'-dihydroxybiphenyl, 2,2-bis(3,5-dibromo-4hydroxyphenyl)propane, and 2,2-bis(3,5-dibromo-4hydroxyphenyl)hexafluoropropane. The most preferred bisphenol is 2,2- bis(3,5-dibromo-4-hydroxyphenyl)propane (commonly known as tetrabromo bisphenol A (TBBA)). The tetrabromo bisphenol is reacted with an ester forming agent which is difunctional so as to form ester functional groups with the bisphenolic. To form polyestercarbonates, this reaction occurs in the further presence of phosgene so that the bisphenolic compound will react with phosgene to form carbonate units. Preferred ester forming groups are dicarboxylic acids and dicarboxylic acid halides. Such dicarboxylic acids or dicarboxylic acid halides are $C_{1-20}$ hydrocarbons substituted with two carboxylic acid or carboxylic acid halide moieties. More preferred, esterifying agents include $C_{1-20}$ aliphatic dicarboxylic acids, $C_{1-20}$ aliphatic dicarboxylic acid halides, $C_{5-20}$ cycloaliphatic dicarboxylic acids, $C_{5-20}$ cycloaliphatic dicarboxylic acid halides, $C_{6-20}$ aromatic dicarboxylic acids, $C_{6-20}$ aromatic dicarboxylic acid halides, a halo-substituted $C_{6-20}$ aromatic dicarboxylic acid, a halo-substituted $C_{6-20}$ aromatic dicarboxylic acid halide, a halo-substituted $C_{1-20}$ aliphatic dicarboxylic acid, a halo-substituted $C_{1-20}$ aliphatic dicarboxylic acid halide, a halo-substituted $C_{5-20}$ cycloaliphatic dicarboxylic acid, or a halo-substituted $C_{5-20}$ cycloaliphatic dicarboxylic acid halide. The preferred class of esterifying agents is the dicarboxylic acid halides, with the preferred class of dicarboxylic acid halides being the dicarboxylic acid chlorides. A preferred group of dicarboxylic acid halides useful as esterifying agents in this invention include those corresponding to the formulas

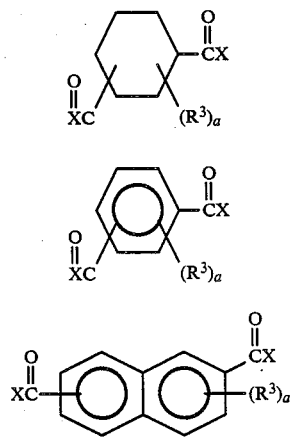

wherein X is a halogen, and $R^3$ and a are as hereinbefore defined. Examples of dicarboxylic acid halides useful in this invention include 1,4-cyclohexane dicarboxylic acid chloride, 1,4-cyclohexane dicarboxylic acid bromide, 1,3-cyclohexane dicarboxylic acid chloride, or 1,3-cyclohexane dicarboxylic acid bromide, terephthaloyl chloride, terephthaloyl bromide, isophthaloyl chloride, isophthaloyl bromide, or 2,6-naphthylene dicarboxylic acid chloride or bromide. More preferred acid halides are terephthaloyl chloride, isophthaloyl chloride, 1,4-cyclohexane dicarboxylic acid chloride, and 2,6-naphthylene dicarboxylic acid chloride. The most preferred acid halides are terephthaloyl chloride, isophthaloyl chloride, or mixtures thereof.

In one preferred embodiment, a mixture of terephthaloyl chloride and isophthaloyl chloride is used as the esterifying agent. The ratio of terephthaloyl chloride to isophthaloyl chloride can be between about 100:0 and 0:100, and most preferably between about 80:20 and 20:80.

Generally, a chain stopping agent is added to the reaction mixture to control the viscosity. The concentration of the chain stopping agent in the reaction mixture has a direct effect on both the molecular weight and the viscosity of the polyestercarbonate prepared. Chain stopping agents are monofunctional compounds which react with a chloroformate site on the backbone of the polymer and by such reaction ends the propagation of the polymer at such a point. Preferable chain stopping agents include monofunctional compounds which are reactive with a chloroformate functionality. Examples of more preferred chain stopping compounds include monofunctional aromatic alcohols, thiols, and amines. Even more preferred chain stopping agents are aromatic alcohol compounds and aliphatic alcohols.

The polyester polycarbonates of this invention are prepared by any process well known in the art. One preferred process is known as the solution process wherein the bisphenol in a chlorinated solvent in the presence of a tertiary amine acid acceptor is contacted with a dicarboxylic acid or diacid chloride in the presence of phosgene with agitation. Further descriptions of the solution process can be found in U.S. Pat. Nos. 4,194,038, 3,028,365, and 4,310,652, all incorporated herein by reference. See also P. W. Morgan, *Condensation Polymers: By Interfacial and Solution Methods*, (Interscience, 1965), page 325-393, relevant portions incorporated herein by reference. Another preferred process for the preparation of polyestercarbonates is an interfacial process, wherein an aqueous bisphenolate solution having a pH of at least about 8 is mixed with phosgene and an organic solution of an acid halide which solution is immiscible with the aqueous bisphenolate solution, at a temperature of about 35° C. or lower for a sufficient time and under sufficient agitation to react said phosgene and said acid halide with said bisphenolate and to form an amorphous polymer. The aqueous phase is separated from the organic phase containing the amorphous polymer. The organic phase is washed with an aqueous liquid, and the substantially amorphous melt processable polyestercarbonate polymer is recovered from the washed organic phase. The organic phase may be based upon any conventional organic solvent for the product polymer. A preferred group of solvents are the chlorinated aliphatic hydrocarbons of 1-4 carbons such as methyl chloride, dichloromethane, chloroform, carbon tetrachloride, dichloroethane, trichloroethane, trichloroethylene, tetrachloroethylene, and mixtures thereof. Another preferred group of solvents is the chlorinated and non-halogenated aromatic hydrocarbons such as toluene, monochlorobenzene, dichlorobenzene, and mixtures thereof. Preferred solvents are the chloromethanes, and especially dichloromethane. The bisphenols useful in this invention are converted to bisphenolates by dissolving the bisphenol in water with an inorganic base, especially in an aqueous or alkaline earth metal hydroxide, preferably an alkali metal hydroxide, and more preferably sodium hydroxide. Further description of interfacial processes can be found in U.S. Pat. Nos. 3,169,121, 3,030,331, 3,028,364, 4,137,128, 4,156,069, 3,207,814, 4,255,556, and 4,311,822, all incorporated herein by reference. See also P. W. Morgan, Supra.

The ratio of acid halide to phosgene generally controls the relative ratio of ester to carbonate units, with the higher ratio of acid halides giving a higher ester content and vice versa. Generally, the molar ratio of phosgene to acid halide or carboxylic acid can be between about 99:1 and 1:99.

In one more preferred embodiment, the membranes useful in this invention are prepared from tetrabromo bisphenol A and a mixture of terephthalyl chloride and isophthalyl chloride. Such polymers generally correspond to the formula

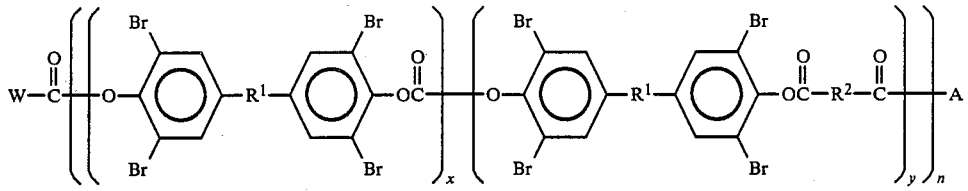

wherein A, W, x, and y are as hereinbefore defined.

The novel membranes of this invention can take any form known to one skilled in the art. In particular, the membrane may be a homogeneous membrane, a composite membrane, or an asymmetric membrane. Furthermore, the membranes may be in the form of a flat sheet, a hollow tube, or a hollow fiber. One skilled in the art would readily know how to prepare a membrane in any of the aforementioned forms. As used herein, the term semi-permeable membrane refers to a membrane which displays different permeabilities for different species of molecules, and therefore, may be used in the separation of ions and molecules having different permeabilities across the membrane. Permeate as used herein refers to those species which permeate through the membrane at a much faster rate than other species. Non-permeate refers herein to those species which permeate at a much slower rate than the other species present.

Preferably, the membranes of this invention are asymmetric or composite membranes, and most preferably asymmetric membranes.

Homogeneous and composite membranes are prepared by forming a thin, discriminating layer which is dense and free of voids and pores. Such membranes or layers have generally the same structure and composition throughout the membrane. In one preferred embodiment, the polyestercarbonates of this invention are dissolved in a water-miscible solvent, for example dimethylformamide or dimethylacetamide. Preferably, the solution contains polymer in weight percents of between about 10 and 80. The form into which the membrane is to be formed affects the membrane casting solution composition. To form a flat sheet membrane between a solution with between about 10 and 20 percent by weight of the polymer is more preferred, with between about 15 and 20 percent being most preferred. This solution should have sufficient viscosity to allow casting of the solution onto a flat surface. The solution should be homogeneous. Thereafter, the polymer is cast on a surface, and in the case of a homogeneous membrane on a surface from which the finished membrane may readily be separated. A convenient way of carrying out this operation is either by casting the membrane solution onto a support surface which may be dissolved away from the finished film following the drying and curing step or by casting the membrane onto a support having low surface energy, such as silicone, coated glass, or a surface to which the membrane will not adhere, such as mercury. Casting is done by pouring the solution onto the appropriate surface and sizing using the appropriate tool, to form a solution of the appropriate thickness. Thereafter, the cast solution is exposed to drying or curing conditions. Such conditions are used to remove the solvent thereby leaving a thin, discriminating layer of polymer which is homogeneous. The solution can be dried either by exposing to a vacuum, exposing to elevated temperatures, by allowing the solvent to evaporate by time, or any combination thereof. Generally, it is preferable to expose the cast solution to elevated temperatures, any temperature at which the solvent evaporates at a reasonable period of time and below the glass transition temperature is suitable, preferably less than about 100° C. In a more preferred embodiment, the temperature used is about 80° C. In one preferred embodiment, such exposure is done in a vacuum oven or under vacuum conditions at elevated temperatures. This drying is performed over a period sufficient to remove the solvent, preferably between 24 and 48 hours. To prepare a hollow fiber membrane, the solution comprises preferably between about 50 and 80 percent by weight of polymer. Preferably, the homogeneous membrane has a thickness of between about 0.5 mils (about 10µ) and about 10.0 mils (about 250µ), and most preferably between about 1 mil (about 25µ) and about 3 mils (about 80µ).

To prepare a composite membrane, a homogeneous thin, discriminating layer can be formed, and thereafter adhered to a porous support after formation. Alternatively, the porous support can be the surface upon which the membrane is cast. In such embodiment, composite membrane is prepared by casting a forming solution as a uniform coating on the porous support which forms the support layer for the finished membrane. Penetration of the polymer from which the thin, discriminating layer is formed into pores of the porous supporting layer and the layer itself is acceptable so long as the desired thickness of the semi-permeable membrane is not exceeded. In a composite membrane, the membrane is supported on a porous substrate or structure. This porous supporting layer is characterized in that it does not greatly impede the transport across this layer of all components of a fluid in contact with the porous layer. The porous supporting layer can comprise a discriminating layer which impedes the transportation of some fluid components to the discriminating layer, but generally this second discriminating layer is not necessary or desirable. In one embodiment, the supporting layer can be a metal or polymeric plate with a plurality of holes drilled through it. However, such a drill plate is not advantageous because it can significantly reduce the effective area of the membrane. In a preferred embodiment, the porous supporting layer is a very porous polymer membrane. Illustrative of such polymeric supporting layers are cellulose ester and microporous polysulfone membranes. Such membranes are commercially available under the trade names MILLIPORE, PELLICON and DIAFLOW. Where such supporting membranes are thin or highly deformable, a frame may also be necessary to adequately support the semi-permeable membrane. In one especially preferred embodiment, the polymeric supporting layer is a hollow fiber of a microporous polymer such as polysulfone, cellulose acetate, or some other cellulose ester. The hollow fiber itself provides adequate support for the semi-permeable membrane layer coated on the inside or outside surface of the fiber. Polysulfone hollow fibers are most preferred for this application. After the solution useful in forming the thin, discriminating layer is cast on the porous support, the porous support and solution cast thereon are then exposed to conditions for removal of the solvent so as to form the dense skin. Such conditions are similar to those described hereinbefore for the formation of the homogeneous membrane.

To form an asymmetric membrane, a solution is cast as described hereinbefore, and thereafter the cast solution is partially cured to remove a portion of the solvent. Thereafter, one or both surfaces of the partially dried membrane is contacted with a water quench so as to form a thin, non-porous, discriminating layer on one or both sides of the membrane under conditions such that the solvent away from the dense layer communicates to the dense layer forming pores in the remainder of the membrane, thereby forming an asymmetric membrane. Such porous layer is present to provide support for the thin, discriminating layer without impeding the transport of the fluid containing the components to be separated semi-permeable, thin, discriminating layer. The partial curing step is performed in a manner similar to the curing step described with respect to the formation of homogeneous membranes.

Hollow fiber membranes can be formed by spinning fibers from an appropriate solution of the polycarbonate in a water-miscible solvent. Such spinning is well known to those skilled in the art, and the formation of hollow fibers which are homogeneous, asymmetric, or composite membranes, requires the adaptation of the hereinbefore described procedures to the hollow fiber form of the membrane. Such adaptations are well within the skill of the art.

Generally, the thin, discriminating layer in a composite or asymmetric form of a membrane has a thickness of between about $0.05\mu$ and $10\mu$, more preferably, between about $0.2\mu$ and $2\mu$.

Under certain conditions, it may be highly desirable to provide support to the membrane when the membrane is employed in a separation apparatus or process. In one embodiment, the peripheral area of the membrane is affixed to a framing structure which supports the outer edge of the membrane. The membrane can be affixed to the framing structure by a clamping mechanism, adhesive, chemical bonding, or other techniques known in the prior art. The membrane affixed to the frame can then be sealingly engaged in the conventional manner in a vessel so that the membrane surface inside the framing support separates two otherwise non-communicating compartments in the vessel. The skilled artisan will recognize that the structure which supports the membrane can be an integral part of the vessel or even the outer edge of the membrane.

In one embodiment, this invention is a process for separating oxygen from nitrogen which comprises contacting a gaseous stream containing oxygen and nitrogen with the membrane of this invention under conditions such that oxygen selectively permeates through the membrane, in comparison to nitrogen. Preferably, the membrane is sealingly engaged to a vessel which defines a space communicating with only one side of the membrane, such that the permeable oxygen contacting the other side of the membrane can permeate through the membrane to the non-communicating space, at a significantly faster rate than the nitrogen communicates or permeates through the membrane. Preferably, the oxygen and nitrogen are a part of an air stream. Preferably, the pressure on the communicating side of the membrane is between about 40 psia (about 275 kPa) and about 200 psia (about 1379 kPa), more preferably between about 80 psia (about 552 kPa) and about 120 psia (about 827 kPa). The temperature at which the mixed oxygen and nitrogen stream is contacted with the membrane is between about 0° and 80° C., most preferably between about 5° and 45° C. The pressure differential across the membrane is preferably between about 40 psia (about 275 kPa) and about 200 psia (about 1379 kPa), and more preferably between about 95 psia (about 655 kPa) and about 120 psia (about 827 kPa). In one preferred embodiment, the membrane is in a hollow fiber form. In one embodiment wherein the membrane is in hollow fiber form, the mixed nitrogen and oxygen stream may be contacted with the membrane on the outside of the hollow fiber under conditions such that the oxygen selectively permeates into the hollow fibers and a stream which is rich in oxygen is taken off of the end of the hollow fibers. This oxygen enriched stream can be further oxygen enriched by contacting with one or more membranes in succession. Alternatively the mixed stream may be contacted with the inside of the hollow fibers under conditions such that the oxygen selectively permeates out of the hollow fibers and a stream rich in nitrogen is taken out of the end of the hollow fiber. This nitrogen stream may be further enriched by contacting it with a series of membranes in succession.

Preferably, the separation membrane exhibits a separation factor for oxygen over nitrogen of at least 6.5. In a more preferred embodiment, the separation factor is at least 7.0 at 20° C.

The membrane of this invention preferably has a reduced flux for oxygen of $1.25 \times 10^{-8}$ cc/cm$^2$-sec cmHg or greater, and more preferably the membrane has a reduced flux for oxygen of $7.56 \times 10^{-8}$ cc/cm$^2$-sec cmHg or greater. In the embodiment wherein the membrane is asymmetric or a composite, the membrane preferably has a reduced flux for oxygen of $8.53 \times 10^{-8}$ cc/cm$^2$-sec cmHg, more preferably the membrane has a reduced flux for oxygen of $5.69 \times 10^{-6}$ (at 0.15 microns)$\times 10^{<5}$ or greater, and most preferably the membrane has a reduced flux for oxygen of $1.70 \times 10^{-5}$ (at 500Å) or greater. Preferably the membrane has a flux of $1.77 \times 10^{\times 5}$ cc/cm$^2$-sec or greater, more preferably the membrane has a flux of $1.18 \times 10^{-3}$ cc/cm$^2$-sec or greater, and most preferably the membrane has a flux of $3.52 \times 10^{-3}$ cc/cm$^2$-sec or greater.

In certain embodiments, the separations of oxygen from nitrogen may be performed at lower temperatures, preferably at about 10° C. or below. It has been discovered that the membranes useful in this invention have surprisingly high separation factors at 10° C. or below. Such separation factors are preferably 8.0 or greater at 10° C. or below, and more preferably 8.5 or greater at 10° C. or below.

SPECIFIC EMBODIMENTS

The following examples are included for illustrative purposes only and do not limit the scope of the claims or the invention. Unless otherwise stated, all parts and percentages are by weight.

EXAMPLE 1

Tetrabromo Bisphenol A Polyestercarbonate With 20 Percent Ester Functionality

Polymerization Procedure

A three-neck, 1.0 liter, round-bottom flask, equipped with a thermometer, air-driven stirrer and glass funnel, is charged with 500 cc of methylene chloride, 108.8 grams (0.2 moles) of 3,3',5,5'-tetrabromo bisphenol A, 2.3 grams (0.01 moles) of isophthaloyl chloride, 2.3 grams (0.01 moles) of terephthaloyl chloride, 0.3 grams (.002 moles) of p-tertiary butyl phenol and 42 cc (0.52 moles) of pyridine. The resultant clear, pale yellow solution is stirred under a nitrogen atmosphere for ten minutes. Moderate stirring is continued and 21 grams (0.21 moles) of phosgene are bubbled into the reaction over a 75 minute period.

The pale yellow, turbid solution is then scavenged with methanol, neutralized with dilute hydrochloric acid and washed a second time with dilute hydrochloric acid. The slightly opaque solution is clarified by passing it through an MSC ion exchange resin bed and precipitated in methanol. The precipitated polymer is dried under vacuum at 80° C. for 24 hours. The resultant polymer is found to have an inherent viscosity of 0.37 dL/g at 25° C. in methylene chloride.

Film Preparation and Testing Procedure

Two grams of polymer are dissolved in 18 grams of methylene chloride, passed through a course, fritted glass filter onto a clean glass plate and drawn down with a casting blade. The sample is covered until dry, removed from the glass plate and annealed under vacuum at 80° C. for 48 hours.

From a cast film, a small disc is removed, the mean thickness and standard deviation are determined and the film is then placed in the cell of a fixed volume-variable pressure gas permeability apparatus. The film has an average thickness of 1.63 mils. Both sides of the membrane are evacuated overnight. One side of the membrane is pressurized with nitrogen at 285 kPaA and the downstream pressure increase is monitored with a pressure transducer and recorded on a single-pen recorder. The transmembrane pressure differential is 187.5 cmHg (250 KPaA). Gas permeability coefficients are calculated from the slope of the time-pressure curve.

Identical procedures are followed with each gas tested using the following sequence of test gases: nitrogen, methane, nitrogen, oxygen, helium, carbon dioxide. The results are compiled in the Table.

EXAMPLE 2

Tetrabromo Bisphenol A Polyestercarbonate With 50 Percent Ester Functionality

Polymerization Procedure

A three-neck, 1.0 liter, round-bottom flask, equipped with a thermometer, air-driven stirrer and glass funnel, is charged with 500 cc of methylene chloride, 108.8 grams (0.2 moles) of 3,3',5,5'-tetrabromo bisphenol A, 12.5 grams (0.054 moles) of isophthaloyl chloride, 1.4 grams (0.062 moles) of terephthaloyl chloride, 0.6 grams (0.007 moles) of p-tertiary butyl phenol and 42 cc (0.52 moles) of pyridine. The resultant clear, pale yellow solution is stirred under a nitrogen atmosphere for ten minutes. Moderate stirring is continued and 16 grams (0.16 moles) of phosgene are bubbled into the reaction over a 65 minute period.

The pale yellow, turbid solution is then scavenged with methanol, neutralized with dilute hydrochloric acid and washed a second time with dilute hydrochloric acid. The slightly opaque solution is clarified by passing it through an MSC ion exchange resin bed and precipitated in methanol. The precipitated polymer is dried under vacuum at 80° C. for 24 hours. The resultant polymer is found to have an inherent viscosity of 0.37 dL/g at 25° C. in methylene chloride.

Film Preparation and Testing Procedure

Two grams of polymer are dissolved in 18 grams of methylene chloride, passed through a course, fritted glass filter onto a clean glass plate and drawn down with a casting blade. The sample is covered until dry, removed from the glass plate and annealed under vacuum at 80° C. for 48 hours.

From a cast film, a small disc is removed, the mean thickness and standard deviation are determined and the film is then placed in the cell of a fixed volume-variable pressure gas permeability apparatus. The film has a thickness of 1.92 mils. Both sides of the membrane are evacuated overnight. One side of the membrane is pressurized with nitrogen at 285 kPaA and the downstream pressure increase is monitored with a pressure transducer and recorded on a single-pen recorder. The transmembrane pressure differential is 187.5 cmHg (250 kPaA). Gas permeability coefficients are calculated from the slope of the time-pressure curve.

Identical procedures are followed with each gas tested using the following sequence of test gases: nitrogen, methane, nitrogen, oxygen, helium, carbon dioxide. The results are compiled in the Table.

EXAMPLE 3

Tetrabromo Bisphenol A Polyestercarbonate With 67 Percent Ester Functionality

Polymerization Procedure

A three-neck, 2.0 liter, round-bottom flask, equipped with a thermometer, air-driven stirrer and glass funnel, is charged with 1,000 cc of methylene chloride, 222 grams (0.41 moles) of 3,3',5,5'-tetrabromo bisphenol A, 8.3 grams (0.041 moles) of isophthaloyl chloride, 33.1 grams (0.163 moles) of terephthaloylchloride, and 86 cc (1.07 moles) of pyridine. The resultant clear, pale yellow solution is stirred under a nitrogen atmosphere for ten minutes. Moderate stirring is continued and 28 grams (0.28 moles) of phosgene are bubbled into the flask over a 41 minute period.

The pale yellow, turbid solution is then scavenged with methanol, neutralized with dilute hydrochloric acid and washed a second time with dilute hydrochloric acid. The slightly opaque solution is clarified by passing it through an MSC ion exchange resin bed and precipitated in methanol. The precipitated polymer is dried under vacuum at 80° C. for 24 hours. The resultant polymer is found to have an inherent viscosity of 0.62 dL/g at 25° C. in methylene chloride.

Film Preparation and Testing Procedure

Two grams of polymer are dissolved in 18 grams of methylene chloride, passed through a course, fritted glass filter onto a clean glass plate and drawn down with a casting blade. The sample is covered until dry, removed from the glass plate and annealed under vacuum at 80° C. for 48 hours.

From a cast film, a small disc is removed, the mean thickness and standard deviation are determined and the film was then placed in the cell of a fixed volume-variable pressure gas permeability apparatus. The membrane thickness is 1.21 mils. Both sides of the membrane are evacuated overnight. One side of the membrane is pressurized with nitrogen at 285 kPaA and the downstream pressure increase is monitored with a pressure transducer and recorded on a single-pen recorder. The transmembrane pressure is 187.5 cmHg (250 kPaA). Gas permeability coefficients are calculated from the slope of the time-pressure curve.

Identical procedures are followed with each gas tested using the following sequence of test gases: nitrogen, methane, nitrogen, oxygen, helium, carbon dioxide. The results are compiled in the Table.

EXAMPLE 4

Tetrabromo Bisphenol A Polyestercarbonate With 80 Percent Ester Functionality

Polymerization Procedure

A three-neck, 5.0 liter, round-bottom flask, equipped with a thermometer, air-driven stirrer and glass funnel, is charged with 2,000 cc of methylene chloride, 450 grams (0.83 moles) of 3,3',5,5'-tetrabromo bisphenol A, 22.4 grams (0.11 moles) of isophthaloyl chloride, 89.6 grams (0.44 moles) of terephthaloyl chloride, and 200 cc (2.48 moles) of pyridine. The resultant clear, pale yellow solution is stirred under a nitrogen atmosphere for ten minutes. Moderate stirring is continued and 38 grams (0.38 moles) of phosgene are bubbled into the reaction over a 32 minute period.

The pale yellow, turbid solution is then scavenged with methanol, neutralized with dilute hydrochloric acid and washed a second time with dilute hydrochloric acid. The slightly opaque solution is clarified by passing it through an MSC ion exchange resin bed and precipitated in methanol. The precipitated polymer is dried under vacuum at 80° C. for 24 hours. The resultant polymer is found to have an inherent viscosity of 0.80 dL/g at 25° C. in methylene chloride.

Film Preparation and Testing Procedure

Two grams of polymer are dissolved in 18 grams of methylene chloride, passed through a course, fritted glass filter onto a clean glass plate and drawn down with a casting blade. The sample is covered until dry, removed from the glass plate and annealed under vacuum at 80° C. for 48 hours.

From a cast film, a small disc is removed, the mean thickness and standard deviation are determined and the film was then placed in the cell of a fixed volume-variable pressure gas permeability apparatus. The film has a thickness of 1.41 mils. Both sides of the membrane are evacuated overnight. One side of the membrane is pressurized with nitrogen at 285 kPaA and the downstream pressure increase is monitored with a pressure transducer and recorded on a single-pen recorder. The transmembrane pressure is 187.5 cmHg (250 kPaA). Gas permeability coefficients are calculated from the slope of the time-pressure curve.

Identical procedures are followed with each gas tested using the following sequence of test gases: nitrogen, methane, nitrogen, oxygen, helium, carbon dioxide. The results are compiled in the table.

EXAMPLE 5

A polyestercarbonate with a percentage of ester linkages of 67 percent and a terephthaloyl chloride to isophthaloyl chloride ratio of 0:1 is prepared as described in Example 1. A film is tested for permeability as described in Example 1. The films are tested for nitrogen and oxygen permeability. The film thickness is 1.52 mils, and the pressure differential across the membrane is 250 kPaA. The results are compiled in the table.

EXAMPLE 6

A polyestercarbonate with a percentage of ester linkage of 95 percent, and a terephthaloyl chloride to isophthaloyl chloride ratio of 1:1 is as described in Example 1. A film is tested as described in Example 1. The films are tested for oxygen and nitrogen permeability. The film thickness is 2.00 mils, and the pressure differential across the membrane is 250 kPaA. The results are compiled in the table.

EXAMPLE 7

A polyestercarbonate with a percentage of ester linkages of 95 percent and a terephthaloyl chloride to isophthaloyl chloride ratio of 2:8 is as described in Example 1. A film is tested as described in Example 1. The films are tested for oxygen and nitrogen permeability. The film thickness is 1.46 mils, and the pressure differential across the membrane is 260 kPaA. The results are compiled in the table.

| Example | Percent Ester* | T/I ratio[2] | $P^1O_2$ | $O_2$ Reduced Flux[5] | $P^1N_2$ | $N_2$ Reduced Flux[5] | Separation[3] Factor | $P^1CH_4$ | $P^1CO_2$ | Separation[4] Factor | $P^1He$ |
|---|---|---|---|---|---|---|---|---|---|---|---|
| 1 | 20% | 1/1 | .97 | $2.34 \times 10^{-8}$ | .14 | $3.38 \times 10^{-9}$ | 7.2 | .089 | 3.55 | 40 | 10.8 |
| 2 | 50% | 1/9 | .96 | $1.96 \times 10^{-8}$ | .13 | $2.67 \times 10^{-9}$ | 7.2 | .095 | 3.73 | 39 | 11.8 |
| 3 | 67% | 8/2 | 1.08 | $3.51 \times 10^{-8}$ | .16 | $5.21 \times 10^{-9}$ | 6.7 | .14 | 4.75 | 33 | 10.3 |
| 4 | 80% | 8/2 | 1.23 | $1.35 \times 10^{-8}$ | .17 | $1.87 \times 10^{-9}$ | 7.2 | .14 | 5.26 | 39 | 11.4 |
| 5 | 67% | 0/1 | 1.1 | $2.8 \times 10^{-8}$ | .14 | $3.7 \times 10^{-9}$ | 7.7 | | | | |
| 6 | 95% | 1/1 | 1.4 | $2.8 \times 10^{-8}$ | .23 | $4.4 \times 10^{-9}$ | 6.3 | | | | |
| 7 | 95% | 2/8 | 1.4 | $3.9 \times 10^{-8}$ | .18 | $4.8 \times 10^{-9}$ | 8.0 | | | | |

[1]P is permeability in the units of barrers (cc-cm/cm$^2$s-cm-Hg) $\times 10^{-10}$
[2]Terephthaloyl chloride to isophthaloyl chloride ratio
[3]Separation factor for oxygen and nitrogen $PO_2/PN_2$
[4]Separation factor for carbon dioxide and methane $PCO_2PCH_4$
[5]Reduced flux units cc/cm$^2$s-cm-Hg
*Functionality

What is claimed is:

1. A method of separating oxygen from a mixture of gases comprising nitrogen and oxygen wherein the method comprises
   a. contacting the gas mixture with a membrane comprising a thin, discriminating layer of polyestercarbonate, wherein the diphenolic residue in the backbone of the polyestercarbonate is a tetrabromo diphenolic residue, under conditions such that the oxygen selectively permeates through the membrane to the other side of the membrane; and
   b. removing the permeated gas from the other side of the membrane;
   wherein the separation factor for oxygen and nitrogen is 6.5 or greater at about 24° C. and a reduced flux of $1.25 \times 10^{-8}$ cc/cm$^2$-sec cmHg or greater oxygen.

2. The method of claim 1 wherein a pressure differential is maintained across the membrane between the side of the membrane in contact with the gas mixture and the other side of the membrane, the higher pressure is maintained on the side of the membrane in contact with the gas mixture.

3. The method of claim 2 wherein the polyestercarbonate corresponds to the formula

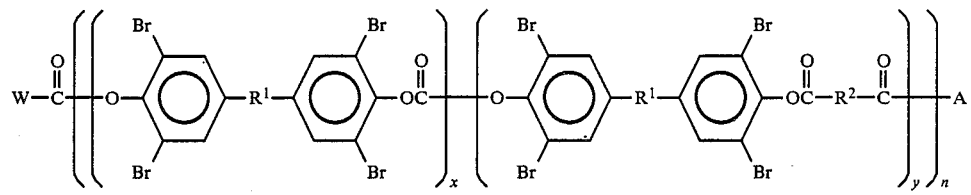

wherein
$R^1$ is separately in each instance a direct bond,

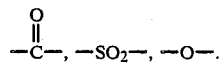

a $C_{1-6}$ divalent hydrocarbon, a $C_{1-6}$ divalent fluorocarbon, or an inertly substituted $C_{1-6}$ divalent hydrocarbon radical; $R^2$ is separately in each instance a $C_{1-20}$ divalent hydrocarbon, or a $C_{1-20}$ divalent hydrocarbon substituted with one or more halo moieties;
W is the residue of a monofunctional compound which is reactive with a chloroformate functionality;
x is 0 or 1;
y is 0 or 1;
n is 50 or greater;
with the proviso that the ratio of units wherein x=1 to units wherein y=1 is between about 99:1 to about 1:99, inclusive.

4. The method of claim 3 which has a separation factor for oxygen and nitrogen of 7.0 or greater and a reduced flux of $7.56 \times 10^{-8}$ cc/cm$^2$-sec cmHg or greater for oxygen.

5. The method of claim 4 wherein
$R^1$ is separately in each occurrence a direct bond, a $C_{1-6}$ divalent hydrocarbon, a $C_{1-6}$ divalent fluorocarbon, or an inertly substituted divalent $C_{1-6}$ hydrocarbon;
$R^2$ is separately in each occurrence a divalent $C_{1-20}$ aliphatic, $C_{5-20}$ cycloaliphatic, $C_{6-20}$ aromatic, a halo-substituted $C_{6-20}$ aromatic, a halo-substituted $C_{1-20}$ aliphatic, or a halo-substituted $C_{5-20}$ cycloaliphatic hydrocarbon;
W is the residue of a monofunctional aliphatic alcohol, aromatic alcohol, thiol, or amine.

6. The method of claim 5 wherein
$R^1$ is a divalent $C_{1-6}$ hydrocarbon;
$R^2$ is a divalent $C_{5-20}$ cycloaliphatic, a $C_{6-20}$ aromatic radical, a halo-substituted $C_{5-20}$ cycloaliphatic, or a $C_{6-20}$ halo-substituted aromatic hydrocarbon;
W is a $C_{1-20}$ hydrocarbyloxy radical.

7. The method of claim 6 wherein
$R^1$ is a divalent $C_{1-6}$ alkylidiene;
$R^2$ is

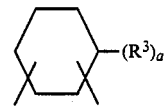

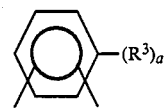

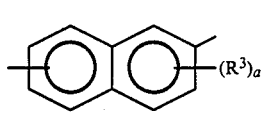

wherein
$R^3$ separately in each occurrence chlorine, fluorine, phenyl, or halogenated alkyl;
a is 0 to 4; and
W is a $C_{1-20}$ alkoxy, $C_{6-20}$ aryloxy, or $C_{7-20}$ alkyl-substituted aryloxy radical.

8. The method of claim 7 wherein
$R^1$ is propylidine;
$R^2$ is

and
W is p-tert butylphenyloxy or methoxy.

9. The method of claim 8 wherein the polyestercarbonate is derived from bisphenol A, and a mixture of terephthaloyl chloride, and isophthaloyl chloride.

10. A method of separating oxygen from a mixture of gases comprising nitrogen and oxygen wherein the method comprises
   a. contacting the gas mixture with on asymmetric or composite membrane comprising a thin, descriminating layer of polyestercarbonate, wherein the diphenolic residue in the backbone of the polyestercarbonate is a tetrabromo diphenolic residue, under conditions such that the oxygen selectively permeates through the membrane to the other side of the membrane; and b. removing the permeated oxygen from the other side of the membrane;

wherein the membrane exhibits separation factor for oxygen and nitrogen is 6.5 or greater at about 24° C. and a reduced flux of $8.53 \times 10^{-8}$ cm/cm²-sec cmHg or greater oxygen.

11. The method of claim 10 wherein a pressure differential is maintained across the membrane between the side of the membrane in contact with the gas mixture and the other side of the membrane, the higher pressure is maintained on the side of the membrane in contact with the gas mixture.

12. The method of claim 11 wherein the polyestercarbonate corresponds to the formula

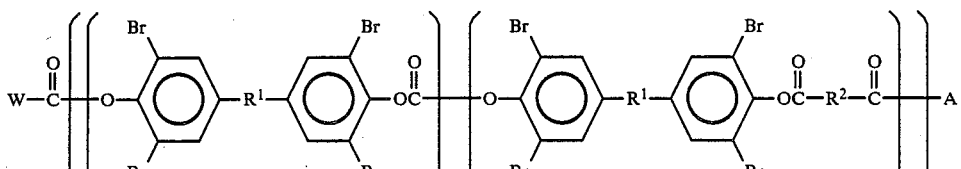

wherein
$R^1$ is separately in each instances direct bond,

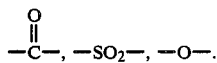

a $C_{1-6}$ divalent hydrocarbon, a $C_{1-6}$ divalent fluorocarbon, or an inertly substituted $C_{1-6}$ divalent hydrocarbon radical;

$R^2$ is separately in each instance a $C_{1-20}$ divalent hydrocarbon, or a $C_{1-20}$ divalent hydrocarbon substituted with one or more halo moieties;

W is the residue of a monofunctional compound which is reactive with a chloroformate functionality;

x is 0 or 1;

y is 0 or 1;

n is 50 or greater;

with the proviso that the ratio of units wherein x=1 to units where y=1 is between about 99:1 to about 1:99, inclusive.

13. The method of claim 12 which has a separation factor for oxygen and nitrogen of 7.0 or greater and a reduced flux of $5.69 \times 10^{-6}$ cc/cm²-sec cmHg or greater for oxygen.

14. The method of claim 13 wherein $R^1$ is separately in each occurrence a direct bond, a $C_{1-6}$ divalent hydrocarbon, a $C_{1-6}$ divalent fluorocarbon, or an inertly substituted divalent $C_{1-6}$ hydrocarbon;

$R^2$ is separately in each occurrence a divalent $C_{1-20}$ aliphatic, $C_{5-20}$ cycloaliphatic, $C_{6-20}$ aromatic, a halo-substituted $C_{6-20}$ aromatic, a halo-substituted $C_{1-20}$ aliphatic, or a halo-substituted $C_{5-20}$ cycloaliphatic hydrocarbon;

W is the residue of a monofunctional aliphatic alcohol, aromatic alcohol, thiol, or amine.

15. The method of claim 14 wherein
$R^1$ is a divalent $C_{1-6}$ hydrocarbon;
$R^2$ is a divalent $C_{5-20}$ cycloaliphatic, a $C_{6-20}$ aromatic radical, a halo-substituted $C_{5-20}$ cycloaliphatic, or a $C_{6-20}$ halo-substituted aromatic hydrocarbon;
W is a $C_{1-20}$ hydrocarbyloxy radical.

16. The method of claim 15 wherein
$R^1$ is a divalent $C_{1-6}$ alkylidiene;
$R^2$ is

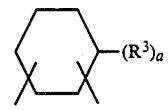

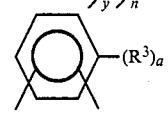

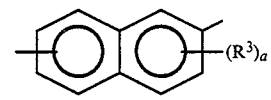

wherein
$R^3$ is separately in each occurrence chlorine, fluorine, phenyl, or halogenated alkyl;
a is 0 to 4; and
W is a $C_{1-20}$ alkoxy, $C_{6-20}$ aryloxy, or $C_{7-20}$ alkyl-substituted aryloxy radical.

17. The method of claim 16 wherein
$R^1$ is propylidene;
$R^2$ is

and
W is p-tert butylphenyloxy or methoxy.

18. The method of claim 17 wherein the polyestercarbonate is derived from bisphenol A, and a mixture of terephthaloyl chloride, and isophthaloyl chloride.

19. A membrane comprising a dense skin of a polyestercarbonate, wherein the diphenolic residue in the backbone of the polyestercarbonate is a tetrabromo diphenolic residue, wherein the membrane has a separation factor for oxygen and nitrogen of 6.5 or greater at about 24° C. and a reduced flux of $1.25 \times 10^{-8}$ cc/cm²-sec cmHg or greater for oxygen.

20. The membrane of claim 19 wherein the polyestercarbonate corresponds to the formula

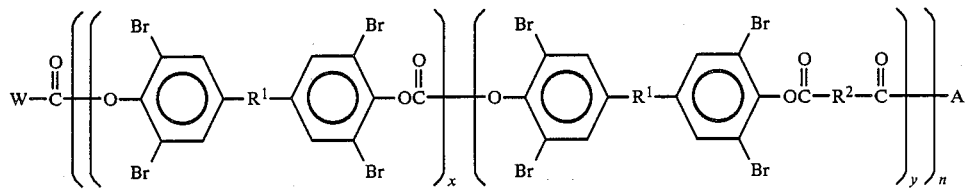

wherein
A is

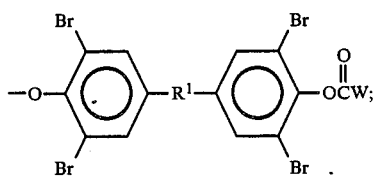

$R^1$ is separately in each instance a single direct bond,

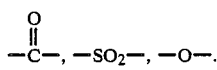

a $C_{1-6}$ divalent hydrocarbon, a $C_{1-6}$ divalent fluorocarbon, or an inertly substituted $C_{1-6}$ divalent hydrocarbon radical;

$R^2$ is separately in each instance a $C_{1-20}$ divalent hydrocarbon or a $C_{1-20}$ divalent hydrocarbon, substituted with one or more halo moieties;

W is the residue of a monofunctional compound which is reactive with a chloroformate functionality;

x is 0 or 1;
y is 0 or 1;
n is 50 or greater;

with the proviso that the ratio of units wherein x=1 to units wherein y=1 is between about 99:1 to about 1:99, inclusive.

21. A membrane of claim 20 which has a separation factor for oxygen and nitrogen of 7.0 or greater and the reduced flux of $7.56 \times 10^{-8}$ cc/cm$^2$-sec cmHg or greater for oxygen.

22. The membrane of claim 21 wherein $R^1$ is separately in each occurrence a direct bond, a $C_{1-6}$ divalent hydrocarbon, a $C_{1-6}$ divalent fluorocarbon, or an inertly substituted divalent $C_{1-6}$ hydrocarbon;

$R^2$ is separately in each occurrence a divalent $C_{1-20}$ aliphatic, $C_{5-20}$ cycloaliphatic, $C_{6-20}$ aromatic, a halo-substituted $C_{6-20}$ aromatic, a halo-substituted $C_{1-20}$ aliphatic, or a halo-substituted $C_{5-20}$ cycloaliphatic hydrocarbon;

W is the residue of a monofunctional aliphatic alcohol, aromatic alcohol, thiol, or amine.

23. The membrane of claim 22 wherein
$R^1$ is a divalent $C_{1-6}$ hydrocarbon; $R^2$ is a divalent $C_{5-20}$ cycloaliphatic, $C_{6-20}$ aromatic radical, a halo-substituted $C_{5-20}$ cycloaliphatic, or a $C_{6-20}$ halo-substituted aromatic hydrocarbon;

W is a $C_{1-20}$ hydrocarbyloxy radical.

24. The membrane of claim 23 wherein
$R^1$ is a divalent $C_{1-6}$ alkylidiene;
$R^2$ is

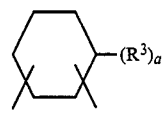

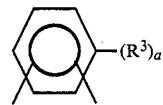

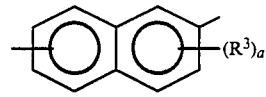

wherein
$R^3$ is separately in each occurrence chlorine, fluorine, phenyl, or halogenated alkyl;
a is 0 to 4: and
W is a $C_{1-20}$ alkoxy, $C_{6-20}$ aryloxy, or $C_{7-20}$ alkyl-substituted aryloxy radical.

25. A membrane of claim 24 wherein
$R^1$ is propylidene;
$R^2$ is

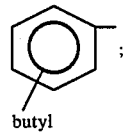

butyl and
W is para-tertiary phenyloxy or methoxy.

26. A membrane of claim 25 wherein the polyestercarbonate is derived from bisphenol A, and a mixture of terephthaloyl chloride, and isophthaloyl chloride.

27. An asymmetric or composite membrane comprising a thin discriminating layer of a polyestercarbonate, wherein the diphenolic residue in the backbone of the polyestercarbonate is a tetrabromo diphenolic residue, wherein the membrane has a separation factor for oxygen and nitrogen of 6.5 or greater at about 24° C. and a reduced flux of $8.53 \times 10^{-8}$ cc/cm$^2$-cmHg or greater for oxygen.

28. The membrane of claim 27 wherein the polyestercarbonate corresponds to the formula

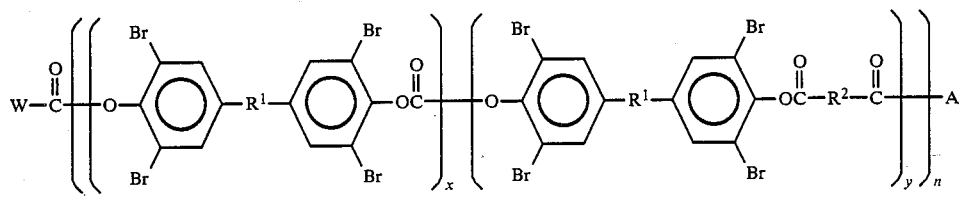

wherein
A is

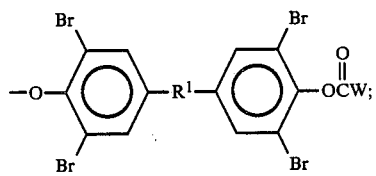

$R^1$ is separately in each instance a single direct bond,

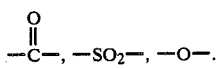

a $C_{1-6}$ divalent hydrocarbon, a $C_{1-6}$ divalent fluorocarbon, or an inertly substituted $C_{1-6}$ divalent hydrocarbon radical;
$R^2$ is separately in each instance a $C_{1-20}$ divalent hydrocarbon or a $C_{1-20}$ divalent hydrocarbon, substituted with one or more halo moieties;
W is the residue of a monofunctional compound which is reactive with a chloroformate functionality:
x is 0 or 1;
y is 0 or 1;
n is 50 or greater:
with the proviso that the ratio of units wherein x=1 to units wherein y =1 is between about 99:1 to about 1:99, inclusive.

29. A membrane of claim 28 which has a separation factor for oxygen and nitrogen of 7.0 or greater and a reduced flux of $5.69 \times 10^{-6}$ cc/cm$^2$-sec cmHg, or greater for oxygen.

30. The membrane of claim 29 wherein
$R^1$ is separately in each occurrence a direct bond, a $C_{1-6}$ divalent hydrocarbon, a $C_{1-6}$ divalent fluorocarbon, or an inertly substituted divalent $C_{1-6}$ hydrocarbon;
$R^2$ is separately in each occurrence a divalent $C_{1-20}$ aliphatic, $C_{5-20}$ cycloaliphatic, $C_{6-20}$ aromatic, a halo-substituted $C_{6-20}$ aromatic, a halo-substituted $C_{1-20}$ aliphatic, or a halo-substituted $C_{5-20}$ cycloaliphatic hydrocarbon;
W is the residue of a monofunctional aliphatic alcohol, aromatic alcohol, thiol, or amine.

31. The membrane of claim 30 wherein
$R^1$ is a divalent $C_{1-6}$ hydrocarbon:
$R^2$ is a divalent $C_{5-20}$ cycloaliphatic, $C_{6-20}$ aromatic radical, a halo-substituted $C_{5-20}$ cycloaliphatic, or a $C_{6-20}$ halo-substituted aromatic hydrocarbon;
W is a $C_{1-20}$ hydrocarbyloxy radical.

32. The membrane of claim 31 wherein
$R^1$ is a divalent $C_{1-6}$ alkylidiene;
$R^2$ is

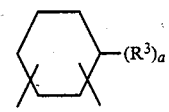

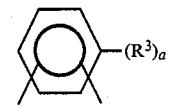

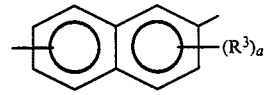

wherein
$R^3$ is separately in each occurrence chlorine, fluorine, phenyl, or halogenated alkyl;
a is 0 to 4; and W is a $C_{1-20}$ alkoxy, $C_{6-20}$ aryloxy, or $C_{7-20}$ alkyl-substituted aryloxy radical.

33. The membrane of claim 32 wherein
$R^1$ is propylidene:
$R^2$ is

and
W is paratertiary butyl phenyloxy or methoxy.

34. The membrane of claim 33 wherein the polyestercarbonate is derived from bisphenol A, and a mixture of terephthaloyl chloride, and isophthaloyl chloride. pg,50

35. The membrane of claim 28 with a flux of $1.77 \times 10^{-5}$ cc/cm$^2$-sec for oxygen.

36. The membrane of claim 35 with a flux of $1.15 \times 10^{-3}$ cc/cm$^2$-sec or greater for oxygen.

UNITED STATES PATENT AND TRADEMARK OFFICE
CERTIFICATE OF CORRECTION

PATENT NO. : 4,840,646
DATED : June 20, 1989
INVENTOR(S) : J. N. Anand et al.

It is certified that error appears in the above-identified patent and that said Letters Patent is hereby corrected as shown below:

Col. 3, line 23, delete "of";

Col. 4, line 19, "separately" has been misspelled;

Col. 10, line 53, delete "$10<^5$" and insert -- $10^{-5}$ --;

Col. 10, line 56, delete "$10\times^5$" and insert -- $10^{-5}$ --;

Col. 16, line 42, after "chlorine" delete "." and insert -- , --;

Col. 16, line 65, delete "on" and insert -- an --;

UNITED STATES PATENT AND TRADEMARK OFFICE
CERTIFICATE OF CORRECTION

PATENT NO. : 4,840,646

DATED : June 20, 1989

INVENTOR(S) : J. N. Anand et al.

It is certified that error appears in the above-identified patent and that said Letters Patent is hereby corrected as shown below:

Col. 17, line 33, delete "instances" and insert -- instance a --;

Col 20, line 65, after "$cm^2$-" insert -- sec --;

Col. 22, line 55, delete "pg, 50".

Signed and Sealed this

Third Day of March, 1992

*Attest:*

HARRY F. MANBECK, JR.

*Attesting Officer*      *Commissioner of Patents and Trademarks*